May 15, 1951 W. Z. KIFER 2,553,260
PARKING METER RESETTING ATTACHMENT
Filed Nov. 13, 1947 2 Sheets-Sheet 1

Inventor
William Z. Kifer
By *Clarence A. O'Brien and Harvey B. Jacobson*
Attorneys May 15, 1951 W. Z. KIFER 2,553,260
PARKING METER RESETTING ATTACHMENT
Filed Nov. 13, 1947 2 Sheets-Sheet 2

Inventor

William Z. Kifer

By *Clarence A. O'Brien and Harvey B. Jacobson*
Attorneys

Patented May 15, 1951

2,553,260

UNITED STATES PATENT OFFICE 2,553,260

PARKING METER RESETTING ATTACHMENT

William Z. Kifer, Tulsa, Okla.

Application November 13, 1947, Serial No. 785,727

1 Claim. (Cl. 161—15)

The present invention relates to new and useful improvements in parking meters and more particularly to means for automatically resetting the meter to its zero position by the action of a vehicle when leaving the parking area.

In the use of parking meters a vehicle parked in the area controlled by the meter will frequently leave the area before the expiration of the parking period and other vehicles may then enter the parking area and remain therein during the unconsumed time without requiring the deposit of an additional coin in the meter. Accordingly considerable revenue is lost to the city treasury in which the meter is located.

It is therefore an important object of the present invention to provide means for automatically tripping the pointer of the meter to return the same to its zero setting by the action of a vehicle leaving the parking area controlled by the meter.

More specifically the invention includes a provision of a treadle device recessed in the pavement adjacent the meter and over which the wheels of a vehicle travel to trip the pointer and release the same from the time controlled mechanism of the meter to thus return the pointer to its zero setting.

A still further object is to provide a device of this character of simple and practical construction, which is easily mounted in position in operative engagement with the pointer of the meter without necessitating any material changes or alterations in the construction thereof and which at the same time is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 5 is an enlarged elevational view of the pointer of the meter with the trip mechanism attached thereto and showing the position of the pointer when set, and Figure 6 is a similar view showing the position of the pointer after being reset and returned to its zero position by the trip device.

Figure 1:
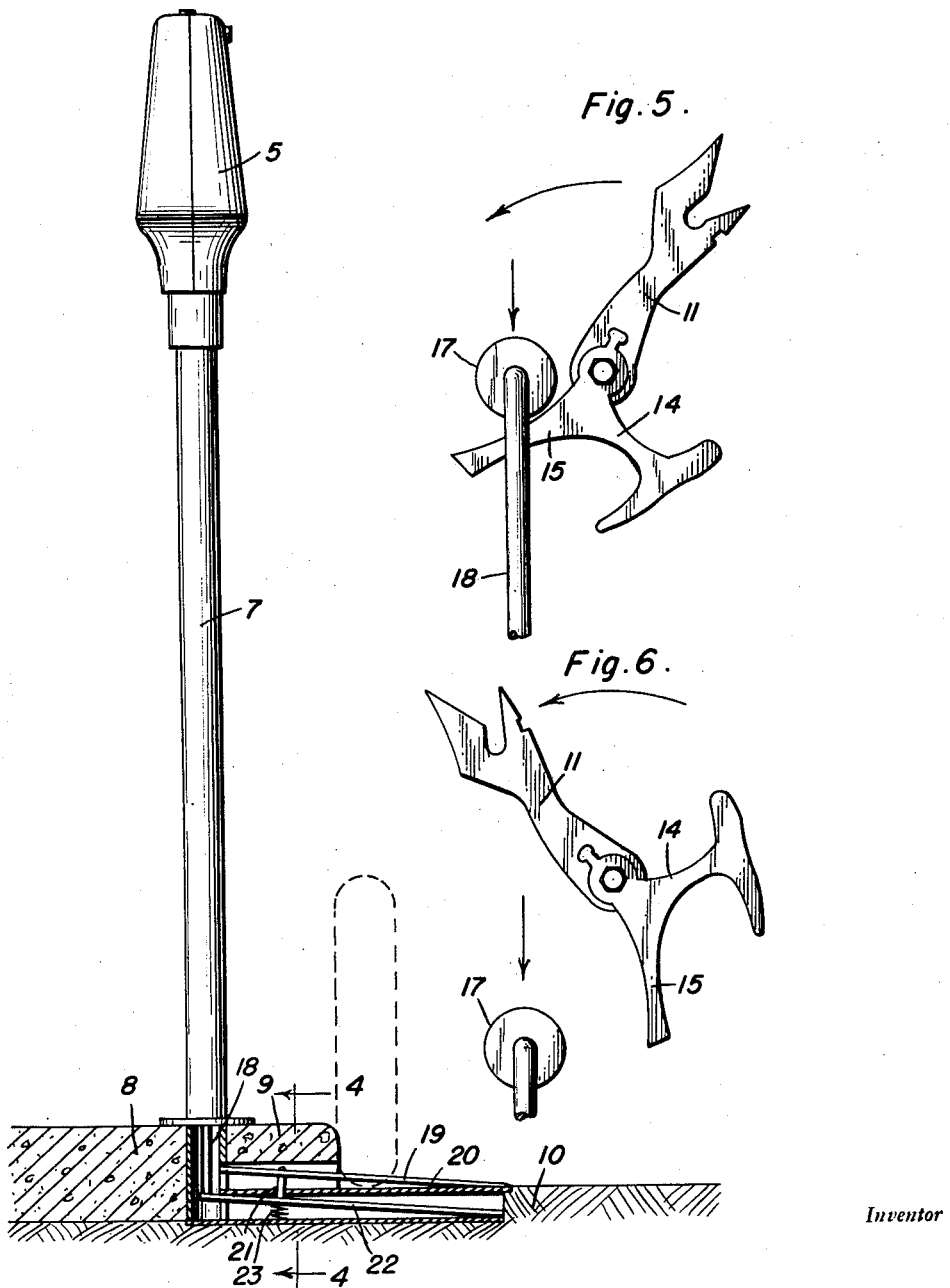
Figure 1 is a side elevational view of a conventional parking meter with the treadle for the trip mechanism shown in section.
Figure 2:
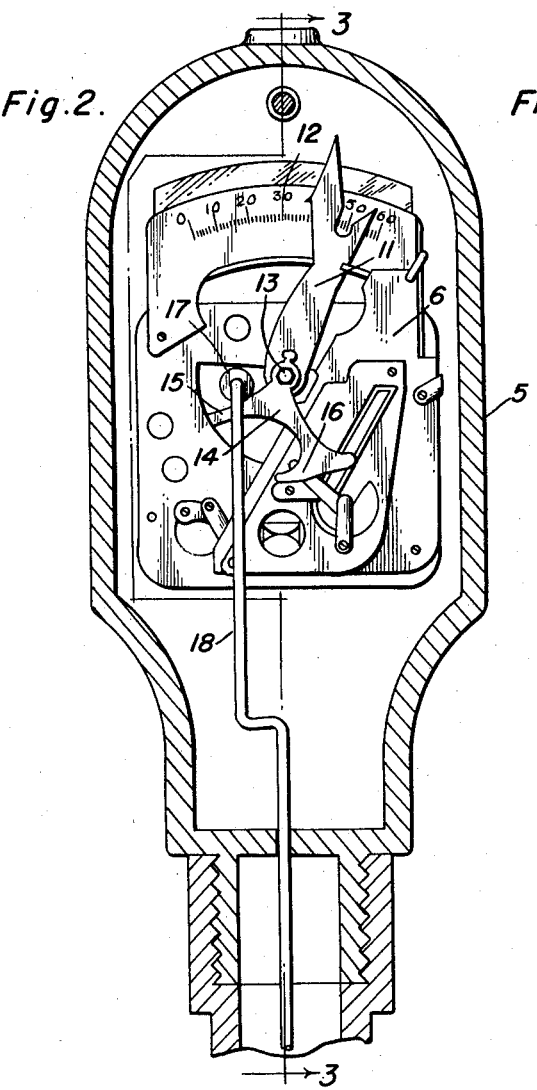
Figure 2 is an enlarged vertical sectional view of the meter showing the connection of the upper end of the trip rod with the pointer of the meter.
Figure 3:
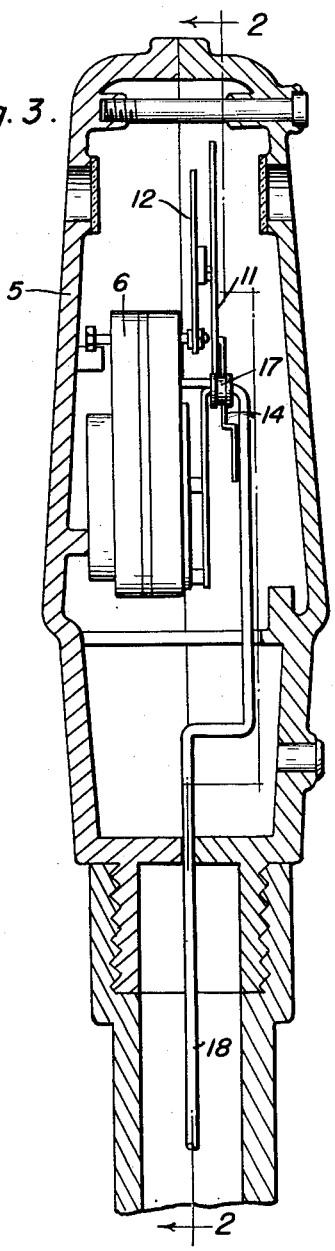
Figure 3 is a similar view taken on line 3—3 of Figure 2.
Figure 4:
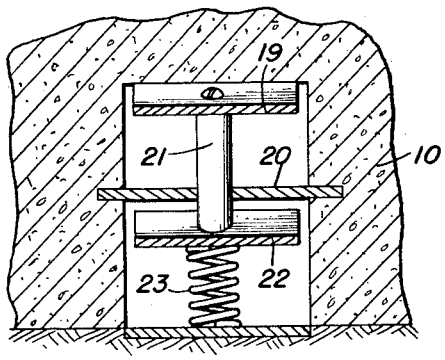
Figure 4 is an enlarged vertical sectional view of the treadle taken on a line 4—4 of Figure 1.

Referring now to the drawings in detail wherein for the purpose of illustration I have disclosed a preferred embodiment of the invention the numeral 5 designates the housing of a conventional parking meter 6, the housing being supported on a hollow stand 7 having its lower end embedded in the sidewalk 8 adjacent the curbing 9 of the pavement 10 of a street or highway.

The meter 6 includes the usual hand or pointer 11 which swings across the face of a scale 12 by a conventional time controlled mechanism to indicate an unexpired lapse of time during which a motorist may leave his car parked in the parking area controlled by the meter.

The hand 11 is moved toward the zero end of the scale 12 by the time controlled mechanism 6 and secured to the arbor 13 of the hand and extending downwardly therefrom is a lever 14 carrying upper and lower laterally extending arms 15 and 16, the lower arm 16 being engaged by the time controlled mechanism to swing the hand toward the zero end of the scale.

The upper arm 15 is engaged by a grooved roller 17 riding on its upper edge and journaled at the upper end of a trip rod 18 which extends downwardly through the standard 7.

A treadle bar 19 is supported in an inclined position upon a treadle housing 20 recessed in the pavement 10 and under the curbing 9 as shown in Figure 1 of the drawings by means of a plunger 21 extending downwardly from the inner end of the treadle bar into the housing 20.

The lower end of plunger 21 is secured to a bar 22 positioned in the housing 20 and held in a raised position by a coil spring 23. One end of bar 22 is connected to the lower end of trip rod 18.

In the operation of the device when a vehicle is parked in the area controlled by the meter, the hand 11 is swung toward the right by depositing the required coin in the meter in the usual manner and the time controlled mechanism 6 then returns the hand toward its zero setting as the parking period elapses.

Should the motorist leave the parking area before the complete lapse of his parking period the movement of a wheel 24 over the treadle bar 19 will pull the trip rod 18 downwardly to force the arm 15 downwardly and thus swing the hand 11 toward the left to its zero setting and thus restore the meter to its original position requiring the deposit of an additional coin by the next car occupying the parking area.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In a parking meter including a meter housing supported on a hollow post rising from the pavement, a time-controlled hand on the housing and an actuating lever secured to the hand having a cam surface; a means for resetting the hand to the zero position comprising a rod extending through the post and housing having a roller on its upper end engaging the cam surface of the actuating lever, an inclined bar beneath the pavement secured at one of its ends to the bottom end of said rod, an inclined treadle above the pavement, a plunger interconnecting said treadle and said bar, and resilient means beneath said bar normally urging said bar and treadle in an upward position whereby when a wheel of an automotive vehicle engages said treadle, the rod and roller are urged downwardly, tripping the hand back to the zero position.

WILLIAM Z. KIFER.

REFERENCES CITED

The following references are of record in the file of this patent:

UNITED STATES PATENTS

| Number | Name | Date |
|---|---|---|
| 2,214,829 | Bullock | Sept. 17, 1940 |
| 2,229,183 | Mitchell | Jan. 21, 1941 |
| 2,462,610 | Burum | Feb. 22, 1949 |